L. E. RICE.
CUTTING MACHINE.
APPLICATION FILED JULY 25, 1908.
909,938.
Patented Jan. 19, 1909.
3 SHEETS—SHEET 2.
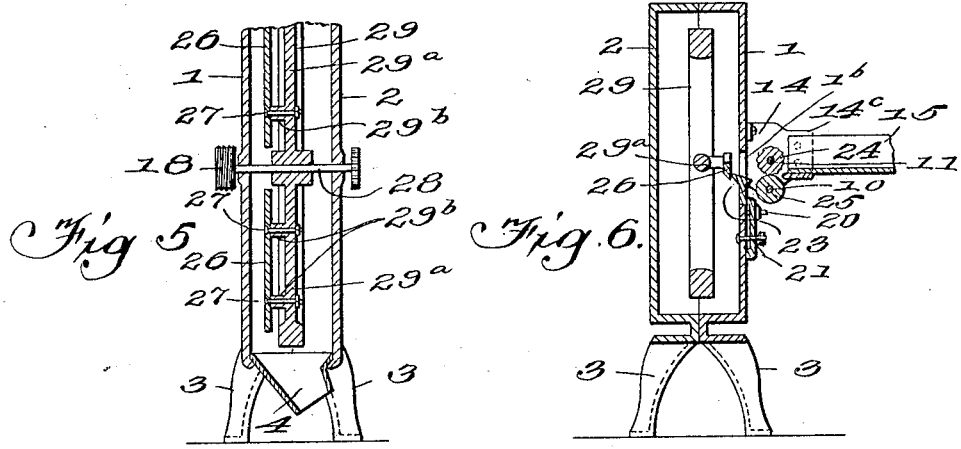
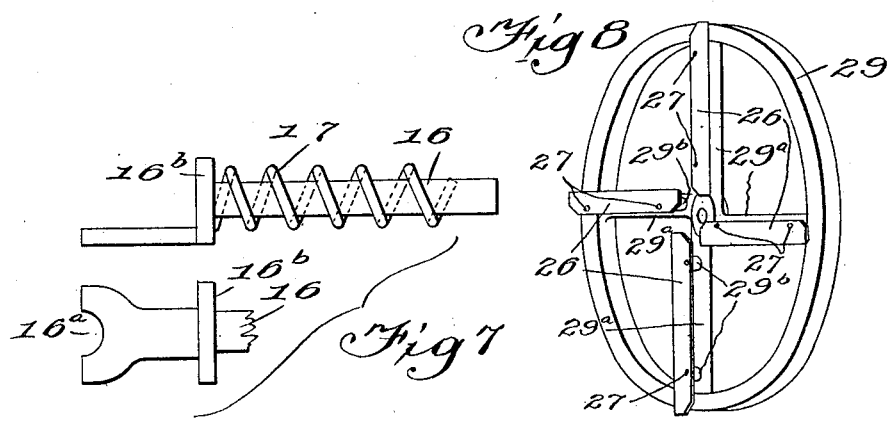
WITNESSES:
INVENTOR
Louis E. Rice.
BY
Attorney

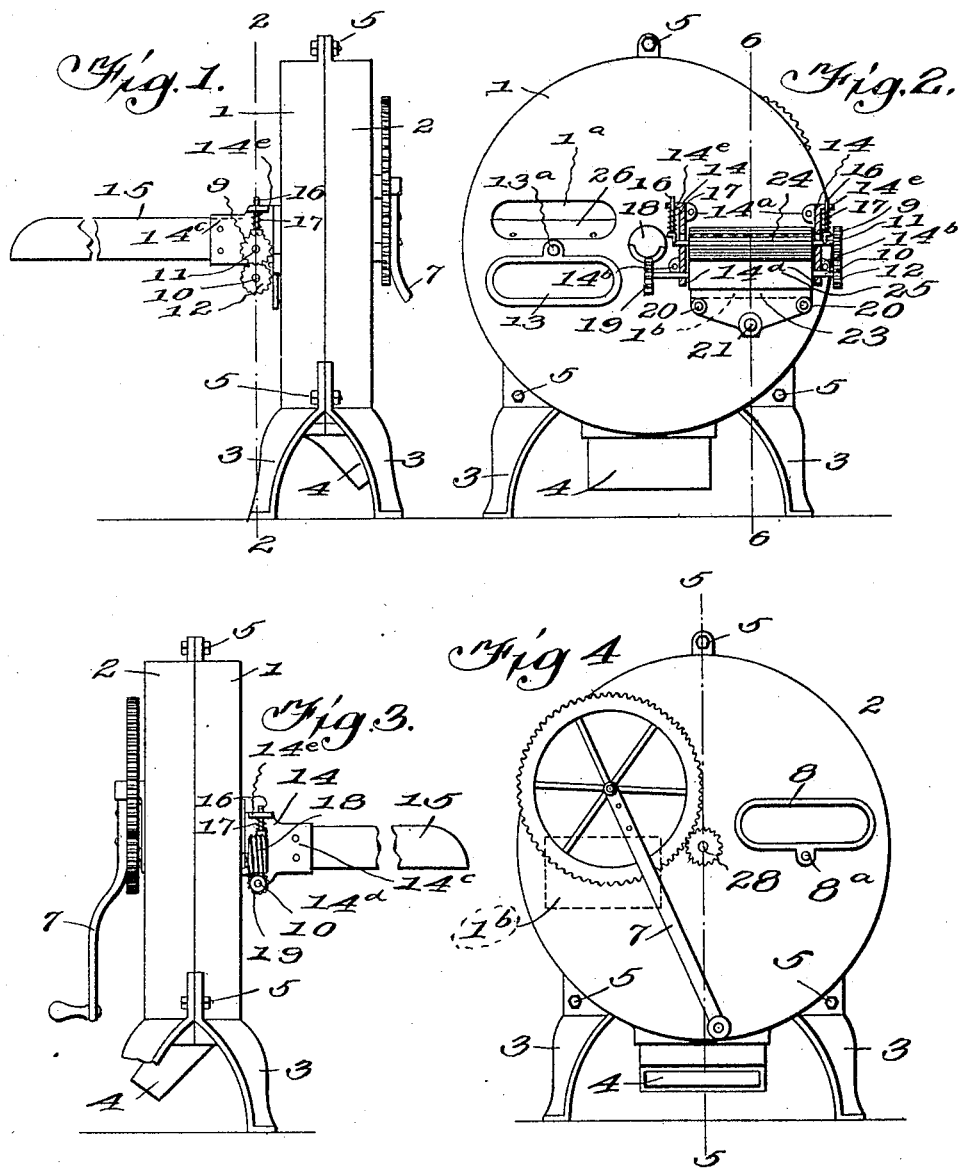

L. E. RICE.
COTTING MACHINE.
APPLICATION FILED JULY 25, 1908.

909,938.

Patented Jan. 19, 1909.
3 SHEETS—SHEET 3.

Witnesses
Geo L Thom
Arthur Wesley

Inventor
Louis E. Rice.
By Gro. E. Tew
Attorney

UNITED STATES PATENT OFFICE.

LOUIS E. RICE, OF CLEVELAND, OHIO, ASSIGNOR TO THE COMMERCIAL MANUFACTURING COMPANY, A CORPORATION OF OHIO.

CUTTING-MACHINE.

No. 909,938.      Specification of Letters Patent.      Patented Jan. 19, 1909.

Application filed July 25, 1908. Serial No. 445,345.

*To all whom it may concern:*

Be it known that I, LOUIS E. RICE, a citizen of the United States, residing at Cleveland, in the county of Cuyahoga and State of Ohio, have invented certain new and useful Improvements in Cutting-Machines, of which the following is a specification.

This invention relates to a machine for cutting such materials as clover, hay, straw and the like, and has for its object to provide an improved machine of the kind characterized particularly by advantages with respect to the cutting blades and the means for operating the same, and the means for feeding the material thereto and for transmitting the motion from the power shaft to the feed roll.

Other improvements with respect to the general construction and economy of space will be apparent from the following description and the accompanying drawings.

Figure 9:
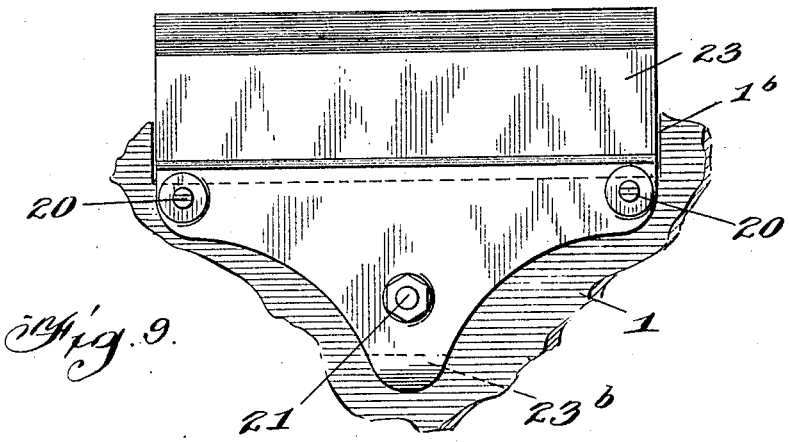
Figure 10:
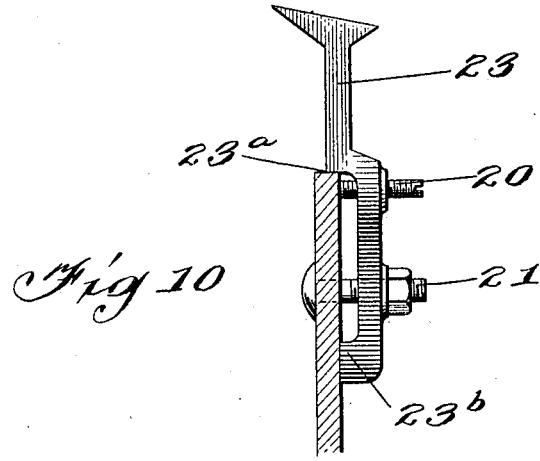

In the drawings, Figure 1 is a side view of the cutter; Fig. 2 is a front view, partly broken away on the line 2—2 of Fig. 1; Fig. 3 is the other side view; Fig. 4 is a back view; Fig. 5 is a section on line 5—5 of Fig. 4; Fig. 6 is a section on line 6—6 of Fig. 2; Fig. 7 shows details of parts for holding the feed rollers; Fig. 8 is a perspective of the balanced fly-wheel with cutter blades thereon; Fig. 9 is an enlarged detail in elevation of the shear plate; Fig. 10 is a detail section thereon.

The casing of the machine consists of two annular shells 1 and 2, supported by legs 3, and held together by bolts 5. A fly wheel 29 is mounted in this casing on shaft 28 and is rotated by means of crank 7, fastened to gear 6 which engages a pinion 22 mounted on shaft 28. Said wheel 29 carries four knives 26 which are fastened to spokes $29^a$ by lugs $29^b$ and bolts 27. The lugs afford clearance for the cut stuff.

The shell 1 has a hole $1^b$ through which the material is fed, and a hole $1^a$ through which the knives may be taken out when desired. The cut stuff falls through the chute 4 at the bottom of the casing and can easily be caught in a basket or the like. A door 13 is pivoted at $13^a$ below the opening $1^a$ and to close same when desired, the door is turned up and the bolt $13^a$ tightened. A similar rear door 8 pivoted at $8^a$ covers an opening in the front wall.

A shear plate 23 is fitted and held in hole $1^b$ by a bolt 21, the shoulder of the plate resting on the lower edge of the opening. Set bolts 20 project through the plate 23 and bear against shell 1. This serves as a means to adjust shear 23 in and out. Bolt 21 pushes it in and bolts 20 push it away at either one end or both. Accordingly the relation of the shear plate to the knives may be varied.

The material is fed into the machine by rolls 24 and 25 mounted on shafts 11 and 10 respectively, and the upper roll 24 is fluted or corrugated to pull the material between the rolls. The shaft 10 and roll 25 are revolved by means of a worm gear 18 on shaft 28 and worm wheel 19 on shaft 10. Gears 12 on shaft 10 and 9 on shaft 11 revolve roll 25 with roll 24. The material is fed to the rolls 24 and 25 by means of a trough 15, which is bolted to cheek pieces 14 on the casing and held firm by flanges $14^c$ on the cheeks.

The shaft 10 is mounted on a lower ear $14^b$ of the cheeks 14, and shaft 11 is mounted in the cheeks in slots so that it can lift a trifle to allow the rolls to spread when a large object enters so as not to break or choke the parts. The roll 24 is held down by means of rods 16 at opposite ends and springs 17. Each rod has a seat $16^b$ and a lower fork $16^a$ which sets on shaft 10 and the rod works through a projection $14^e$ on the cheek pieces, the spring being in compression between the seat and the projection. The cheek pieces 14 are fastened to 1 by bolts through ears $14^a$ and $14^b$.

In operation, material fed into the trough is passed by the rolls into the casing and above the shear plate, and the blades coöperating with said plate cut the material and the cut stuff falls out through the chute. The fly wheel carrying the blades is an advantageous feature, as it gives momentum to the cutting strokes. The feed is positive, and the adjustment of the shear plate to the knives is simple and convenient, and renewal of any part can be easily effected. The closed casing protects the parts and tends to prevent accident.

The shear plate 23 and the manner of adjusting the same constitute important features of this invention. The said plate has two adjustable contact screws 20 and a stationary contact point $23^b$ at the bottom, with the bolt 21 therebetween, the shoulder $23^a$ resting on the edge of the casing at the feed opening, as above referred to. The adjusting screws 20 are located in an upper position on each side of the middle line, or near the side edges of the shear plate, and the fixed contact 23ᵇ is located at the middle line, forming a triangle of contacts, the fastening bolt 21 being located inside the triangle. This allows an adjustment inwardly or outwardly at either edge of the shear plate, so that it can be set exactly right to coöperate with the knives.

I claim:

1. The combination of a casing having the feed opening therein, a shear plate projecting through the opening and having two adjusting devices located near the side edges thereof, in an upper position toward the shearing edge, and a middle fixed contact point at the lower edge, and means for attaching said plate to the casing.

2. The combination with the casing of a cutter, said casing having an opening in the side, of a shear plate attached to the casing and located at the opening, said plate having a lower contact point and two upper adjusting screws between the plate and the casing, and forming with the point a triangle.

In testimony whereof I affix my signature in presence of two witnesses.

LOUIS E. RICE.

Witnesses:
JOHN A. BOMMHARDT,
MONROE E. MILLER.